US012687189B2

(12) United States Patent
Yang

(10) Patent No.: US 12,687,189 B2
(45) Date of Patent: Jul. 21, 2026

(54) EASY-TO-MOUNT CONNECTOR

(71) Applicant: ZHEJIANG PRULDE ELECTRIC APPLIANCE CO., LTD., Jinhua (CN)

(72) Inventor: Weiming Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 297 days.

(21) Appl. No.: 18/681,079

(22) PCT Filed: Aug. 10, 2021

(86) PCT No.: PCT/CN2021/111789
§ 371 (c)(1),
(2) Date: Feb. 5, 2024

(87) PCT Pub. No.: WO2023/010594
PCT Pub. Date: Feb. 9, 2023

(65) Prior Publication Data
US 2024/0271731 A1 Aug. 15, 2024

(30) Foreign Application Priority Data
Aug. 6, 2021 (CN) .......................... 202121835994.0

(51) Int. Cl.
*F16B 21/02* (2006.01)
*F16B 21/16* (2006.01)
*B27G 11/00* (2006.01)

(52) U.S. Cl.
CPC ............. *F16B 21/02* (2013.01); *F16B 21/16* (2013.01); *B27G 11/005* (2013.01)

(58) Field of Classification Search
CPC .......... F16B 21/02; F16B 21/04; F16B 21/10; F16B 21/16; F16L 37/107; F16L 37/12;
(Continued)

(56) References Cited

U.S. PATENT DOCUMENTS 4,491,060 A * 1/1985 Boski ...................... F16J 13/12
403/349
4,668,119 A * 5/1987 Galletti ................... E02D 5/523
405/251
(Continued)

FOREIGN PATENT DOCUMENTS

CN 101173697 A 5/2008
CN 203477708 U 3/2014
(Continued)

*Primary Examiner* — Amber R Anderson
*Assistant Examiner* — Kevin J Baynes
(74) *Attorney, Agent, or Firm* — Bayramoglu Law Offices LLC

(57) ABSTRACT

An easy-to-mount connector includes a fixed assembly and a movable assembly having an end extending into the fixed assembly and connected to the fixed assembly, wherein the fixed assembly has a tubular connecting portion, at least one set of buckling components is arranged on an outer peripheral surface of the connecting portion, and each buckling component includes a circumferential positioning protrusion arranged along an axial direction of the connecting portion; the circumferential positioning protrusion has two or more mutually parallel axial positioning protrusions extending along a circumferential direction of the connecting portion; a snap-in groove is formed between every two adjacent axial positioning protrusions; and the fixed assembly has a surrounding portion matched with the connecting portion, and an inner side of the surrounding portion is provided with buckling components misaligned with the buckling components on the surface of the connecting portion.

14 Claims, 4 Drawing Sheets

(58) Field of Classification Search
CPC ............. B27G 11/005; Y10T 403/7005; Y10T
403/7008
See application file for complete search history.

(56) References Cited

U.S. PATENT DOCUMENTS

| | | | | | |
|---|---|---|---|---|---|
| 5,318,570 | A | * | 6/1994 | Hood | ................. A61B 17/8847 601/2 |
| 5,324,297 | A | * | 6/1994 | Hood | ........................ B06B 3/00 606/169 |
| 5,400,461 | A | * | 3/1995 | Malish | ................. A47L 11/162 403/348 |
| 5,403,043 | A | * | 4/1995 | Smet | ................. E21B 17/0423 285/391 |
| 6,119,306 | A | * | 9/2000 | Antonucci | ............. E05F 5/022 24/297 |
| 7,682,120 | B1 | * | 3/2010 | Goldbaum | ........... F16B 39/122 411/553 |
| 8,382,415 | B1 | * | 2/2013 | Goldbaum | ........... F16B 39/122 411/383 |
| 8,979,417 | B2 | * | 3/2015 | Wandelt | ................ B60Q 1/045 403/350 |
| 9,140,285 | B2 | * | 9/2015 | Burton | ................. F16B 33/006 |
| 9,851,049 | B1 | * | 12/2017 | Spronken | ............. F16M 13/022 |
| 10,816,027 | B2 | * | 10/2020 | May | ........................ F16B 33/02 |
| 10,967,288 | B2 | * | 4/2021 | Lin | ....................... A63H 33/106 |
| 11,766,800 | B2 | * | 9/2023 | Myrhum, Jr. | ......... F16B 37/085 403/118 |
| 12,385,513 | B2 | * | 8/2025 | Matthes | ............... F16B 5/0664 |
| 2009/0242470 | A1 | | 10/2009 | Muenkel et al. | |

FOREIGN PATENT DOCUMENTS

| | | | | |
|---|---|---|---|---|
| CN | 105921333 | A | 9/2016 | |
| CN | 206129383 | U | 4/2017 | |
| CN | 109642692 | A | 4/2019 | |
| EP | 1340550 | A2 | 9/2003 | |
| EP | 2731204 | A1 | 5/2014 | |
| FR | 2686128 | A1 * | 7/1993 | ........... F16B 37/085 |

* cited by examiner

EASY-TO-MOUNT CONNECTOR

CROSS-REFERENCE TO THE RELATED APPLICATIONS

This application is the national phase entry of International Application No. PCT/CN2021/111789, filed on Aug. 10, 2021, which is based upon and claims priority to Chinese Patent Application No. 202121835994.0, filed on Aug. 6, 2021, the entire contents of which are incorporated herein by reference.

TECHNICAL FIELD

The present invention relates to the technical field of mechanical connectors, in particular to an easy-to-mount connector.

BACKGROUND OF THE INVENTION

A glue gun is a tool for gluing or dispensing glue. It includes an assembled hose holder and a hose bracket connected and fixed to the hose holder. The bracket is further slidably connected to a push rod. The push rod is driven by a handle attached to the hose bracket.

In the prior art, the hose holder and the bracket are in threaded connection at the same time. On the one hand, they need to rotate many rounds relative to each other to achieve an effective connection. On the other hand, when they are in the threaded connection, after 30 times of gluing, the hose holder will slowly loosen along the thread and needs to be re-tightened, which is not conducive to continuous gluing operation.

BRIEF SUMMARY OF THE INVENTION

An objective of the present invention is to provide an easy-to-mount connector. The present invention uses a fixed assembly and a movable assembly to snap into each other. The snapped structure is stable and can be mounted easily and used conveniently.

In order to solve this technical problem, the technical solution of the present invention is as follows: an easy-to-mount connector, including a fixed assembly and a movable assembly having an end extending into the fixed assembly and connected to the fixed assembly, wherein the fixed assembly has a tubular connecting portion, at least one set of buckling components is arranged on an outer peripheral surface of the connecting portion, and each buckling component includes a circumferential positioning protrusion arranged along an axial direction of the connecting portion; the circumferential positioning protrusion has two or more mutually parallel axial positioning protrusions extending along a circumferential direction of the connecting portion; a snap-in groove is formed between every two adjacent axial positioning protrusions;

the fixed assembly has a surrounding portion matched with the connecting portion, and an inner side of the surrounding portion is provided with buckling components misaligned with the buckling components on the surface of the connecting portion; the buckling components of the fixed assembly and the corresponding buckling components of the movable assembly are arranged facing each other, and the axial positioning protrusions of one of the two sets of buckling components extend into the snap-in grooves of the corresponding set of buckling components.

As a further improvement, one end of each axial positioning protrusion of the same buckling component starts from the circumferential positioning protrusion. In the present invention, each axial positioning protrusion starts from the circumferential positioning protrusion on the same buckling component, and the connection structure is stable and reliable.

As a further improvement, when the fixed assembly and the movable assembly rotate toward each other, the circumferential positioning protrusion of one buckling component is on a moving path of the axial positioning protrusions of the matched buckling component. The present invention ensures that the circumferential positioning protrusion can limit the position of the buckling component that can rotate toward the circumferential positioning protrusion, thereby preventing the two from relative rotation.

As a further improvement, each of the circumferential positioning protrusions is a continuous integrated structure. In the present invention, the circumferential positioning protrusions are continuous integrated structures to ensure the reliability of position limiting.

As a further improvement, one end of each axial positioning protrusion of one of the buckling components away from the circumferential positioning protrusion of said buckling component has an inclined guide surface. The present invention facilitates the misaligned insertion of the axial positioning protrusions of the two sets of buckling components, and the inclined guide surfaces facilitate the matching of the two sets of buckling components, thereby improving the convenience of engagement.

As a further improvement, when the fixed assembly and the movable assembly are engaged, reinforcing positioning protrusions respectively arranged on the connecting portion and the surrounding portion are in misaligned distribution. During assembly of the present invention, the reinforcing positioning protrusions on the movable assembly cross the reinforcing positioning protrusions of the fixed assembly to form misaligned distribution. Since the reinforcing positioning protrusions hinder each other, the fixed assembly and the movable assembly cannot be loosened without the application of a rotational external force. The present invention has a stable structure during use and thus can be used reliably.

As a further improvement, the axial positioning protrusions of one of the buckling components include at least one first axial positioning protrusion with a width W, and others are second axial positioning protrusions with a width D, where W>D; the buckling component matched with said buckling component has a positioning groove that receives the first axial positioning protrusion. By arranging at least one wide first axial positioning protrusion, the present invention prevents the problem that the fixed assembly and the movable assembly are not matched properly because the axial positioning protrusions of the fixed assembly and the movable assembly are only engaged in part. By arranging the first axial positioning protrusion with varying widths, the accurate axial alignment of the mixed component and the movable assembly is effectively ensured, which is beneficial to improving the use reliability of the present invention.

As a further improvement, a limiting protrusion is arranged on a side of the connecting portion away from the fixed assembly, and the positioning groove is formed between the limiting protrusion and the axial positioning protrusion adjacent to the limiting protrusion;

correspondingly, the first axial positioning protrusion of each set of buckling components of the fixed assembly is located at an end of the fixed assembly close to the movable assembly.

The present invention effectively ensures accurate axial alignment of the fixed assembly and the movable assembly through the matching of the first axial positioning protrusion and the positioning groove.

As a further improvement, a circumferential surface of the connecting portion is provided with two or more sets of buckling components evenly distributed and oriented in the same direction, wherein the circumferential positioning protrusions of all the buckling components are located on the same side of the axial positioning protrusions;

the surrounding portion of the fixed assembly is provided with a corresponding number of buckling components evenly distributed and oriented in an opposite direction relative to the buckling components on the surface of the connecting portion, wherein the circumferential positioning protrusions of all the buckling components are on the other side of the axial positioning protrusions.

By arranging multiple sets of mutually matched buckling components, the present invention effectively shortens the buckling distance, improves the convenience of use, and also ensures the reliability of the present invention.

By adopting the above technical solutions, the beneficial effects of the utility are as follows:

According to the present invention, at least one set of buckling components is arranged on an outer peripheral surface of the connecting portion of the movable assembly, and each buckling component includes a circumferential positioning protrusion arranged along an axial direction of the connecting portion; the circumferential positioning protrusion has two or more mutually parallel axial positioning protrusions extending along a circumferential direction of the connecting portion; a snap-in groove is formed between every two adjacent axial positioning protrusions; the fixed assembly has a surrounding portion matched with the connecting portion, and an inner side of the surrounding portion is provided with buckling components misaligned with the buckling components on the surface of the connecting portion; the buckling components of the fixed assembly and the corresponding buckling components of the movable assembly are arranged facing each other, and the axial positioning protrusions of one of the two sets of buckling components extend into the snap-in grooves of the corresponding set of buckling components. In the present invention, the mutually inserted axial positioning protrusions limit each other to realize their axial positioning, and the axial positioning protrusions are hindered by the matched circumferential positioning protrusions to prevent their relative rotation in the circumferential direction, thereby realizing their engagement conveniently and quickly. The mutual matching of the buckling components in the present invention is implemented in a square area, which effectively ensures the structural stability of their engagement. The present invention brings convenience in mounting and use.

The present invention can be applied to the connection of air pipes, water pipes, and oil pipes, and can also be used in hair dryers, vacuum cleaners, cleaning machines, sprayers, spray guns, glue guns, etc., with a wide range of applications.

In this way, the above-mentioned objective of the present invention is thus achieved.

4

Figure 1:
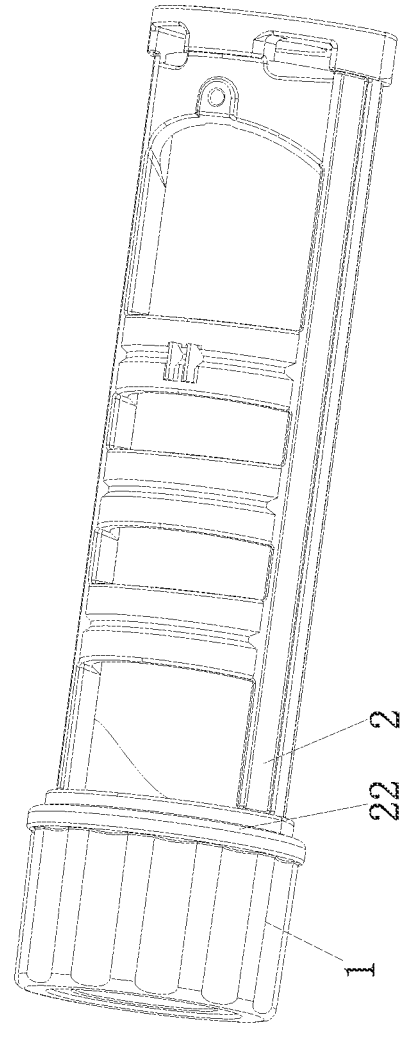
FIG. 1 is a schematic structural diagram of an easy-to-mount connector according to the present invention.
Figures 2, 3:
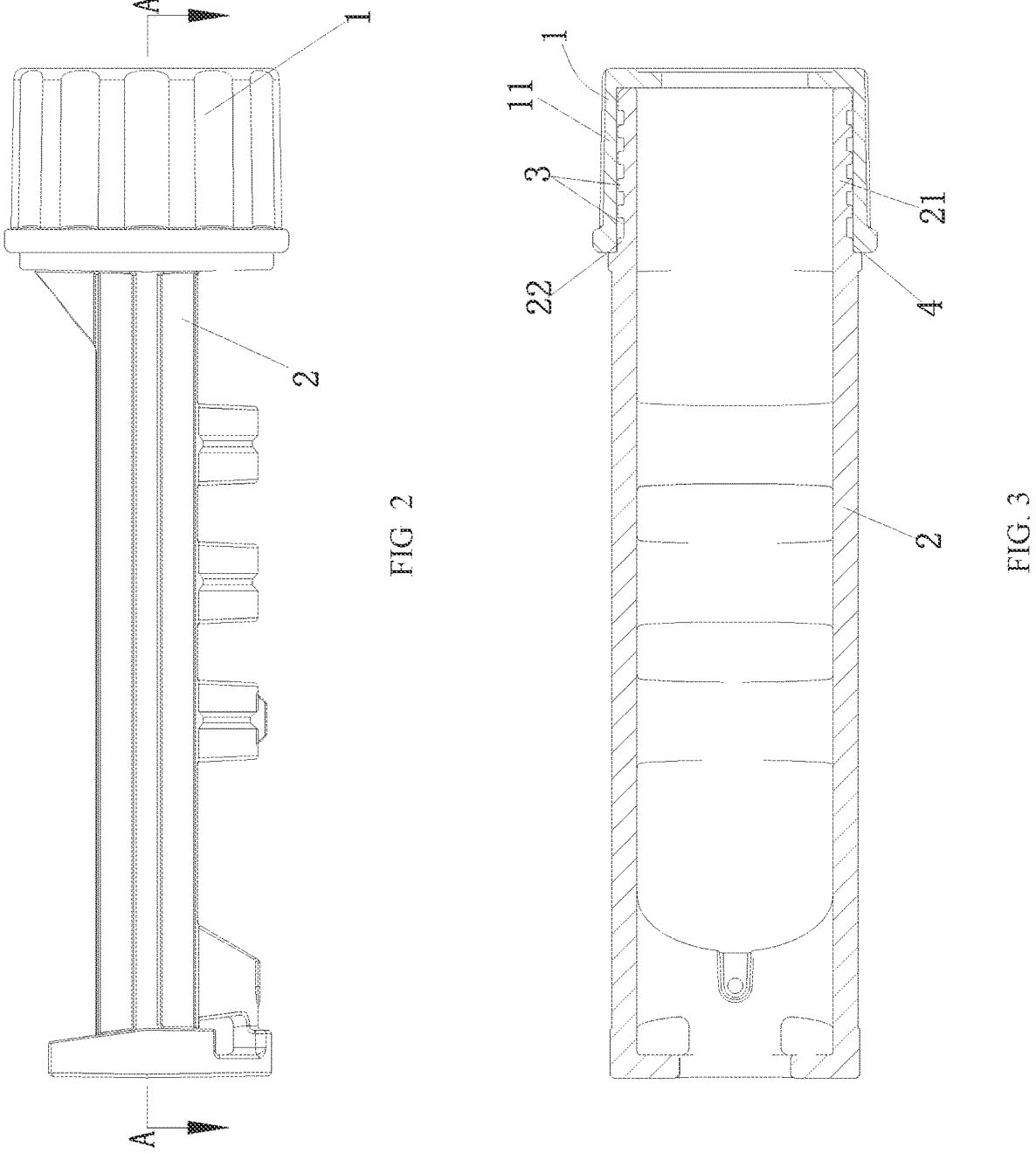
FIG. 2 is a front view of the present invention.
Figures 4, 5, 6:
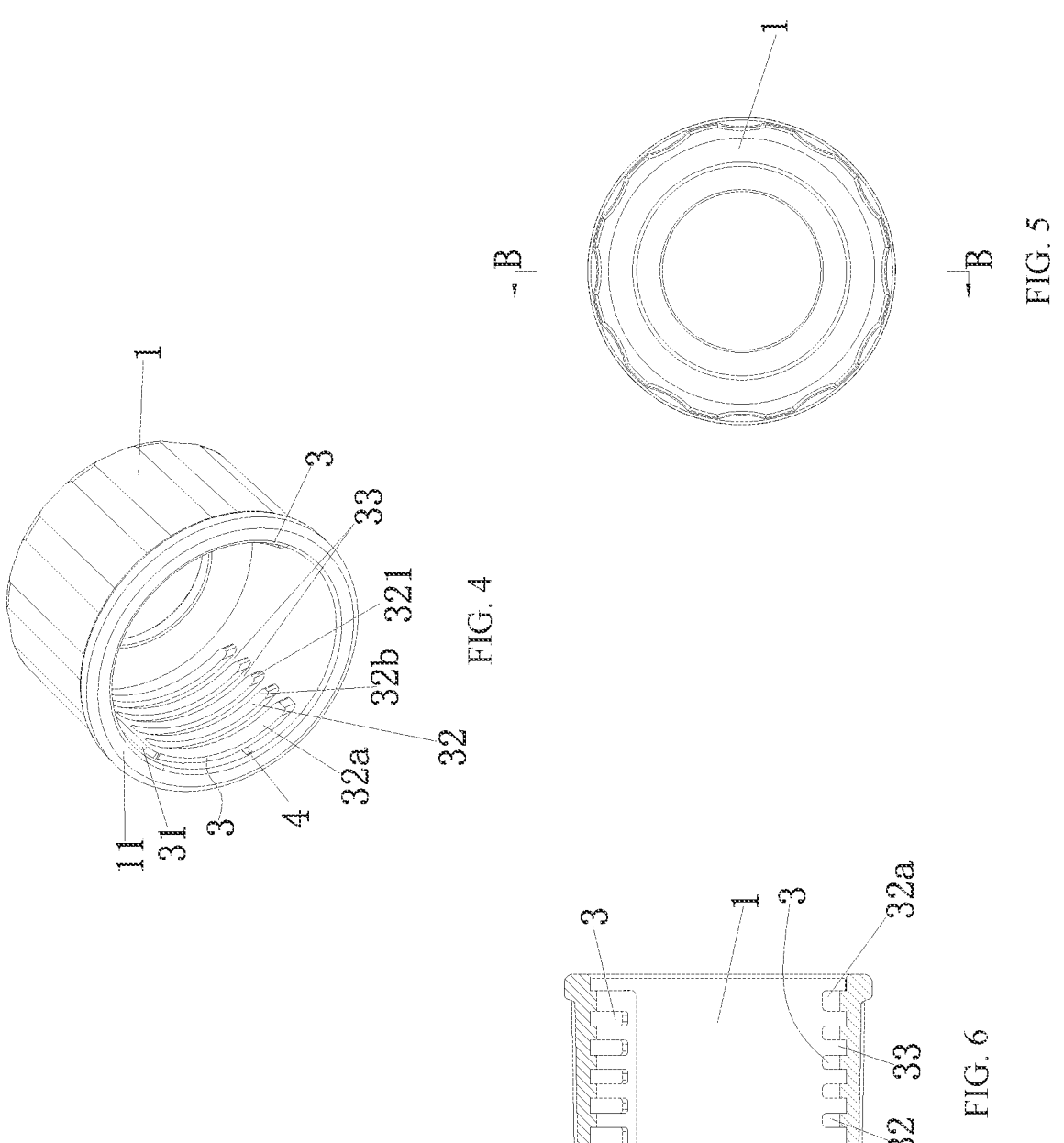

FIG. 3 is a cross-sectional view taken along A-A in FIG. 2;

FIG. 4 is a perspective view of a fixed assembly of the present invention;

FIG. 5 is a front view of the fixed assembly of the present invention;

FIG. 6 is a cross-sectional view taken along B-B in FIG. 5; and

Figure 7:
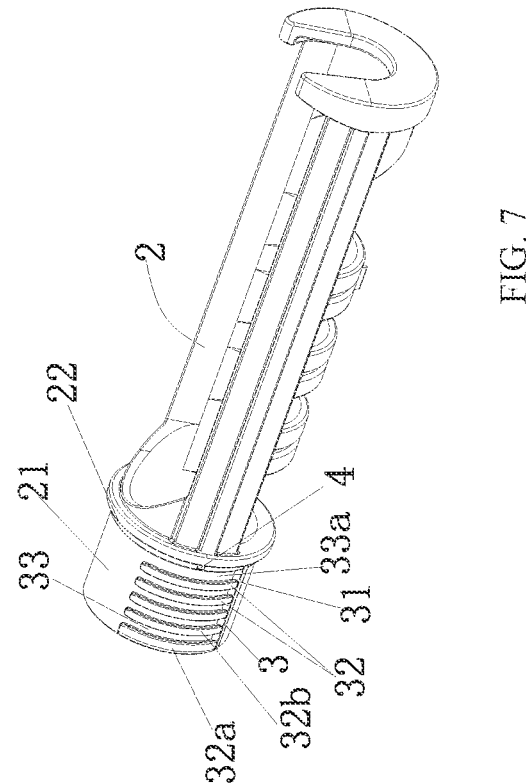

FIG. 7 is a perspective view of a movable assembly of the present invention.

In the figures, fixed assembly 1; surrounding portion 11; movable assembly 2; connecting portion 21; limiting protrusion 22; buckling component 3; axial positioning protrusion 32; first axial positioning protrusion 32a; second axial positioning protrusion 32b; guide surface 321; snap-in groove 33; positioning groove 33a; reinforcing positioning protrusion 4.

DETAILED DESCRIPTION OF THE INVENTION

In order to further explain the technical solution of the present invention, the present invention will be described in detail through specific embodiments below.

The present invention discloses an easy-to-mount connector, as shown in FIG. 1 to FIG. 7, including a fixed assembly 1 and a movable assembly 2 having an end extending into the fixed assembly 1 and connected to the fixed assembly 1, wherein the fixed assembly 2 has a tubular connecting portion 21, at least one set of buckling components 3 is arranged on an outer peripheral surface of the connecting portion 21, and each buckling component 3 includes a circumferential positioning protrusion 31 arranged along an axial direction of the connecting portion 21; the circumferential positioning protrusion 31 has two or more mutually parallel axial positioning protrusions 32 extending along a circumferential direction of the connecting portion 21; a snap-in groove 33 is formed between every two adjacent axial positioning protrusions 32; the fixed assembly 1 has a surrounding portion 11 matched with the connecting portion 21, and an inner side of the surrounding portion 11 is provided with buckling components 3 misaligned with the buckling components 3 on the surface of the connecting portion 21; the buckling components 3 of the fixed assembly 1 and the corresponding buckling components 3 of the movable assembly 2 are arranged facing each other, and the axial positioning protrusions 32 of one of the two sets of buckling components 3 extend into the snap-in grooves 33 of the corresponding set of buckling components 3.

In this embodiment, one end of each axial positioning protrusion 32 of the same buckling component 3 starts from the circumferential positioning protrusion 31. In the present invention, each axial positioning protrusion 32 starts from the circumferential positioning protrusion 31 on the same buckling component 3, and the connection structure is stable and reliable.

In this embodiment, when the fixed assembly 1 and the movable assembly 2 rotate toward each other, the circumferential positioning protrusion 31 of one buckling component 3 is on a moving path of the axial positioning protrusions 32 of the matched buckling component 3. The present invention ensures that the circumferential positioning protrusion 31 can limit the position of the buckling component 3 that can rotate toward the circumferential positioning protrusion 31, thereby preventing the two from relative rotation. When this embodiment is applied to a gluing gun, continuous gluing is ensured.

In this embodiment, each of the circumferential positioning protrusions 31 is a continuous integrated structure. In this embodiment, the circumferential positioning protrusions 31 are continuous integrated structures to ensure the reliability of position limiting.

In this embodiment, one end of each axial positioning protrusion 32 of one of the buckling components 3 away from the circumferential positioning protrusion 31 of said buckling component 3 has an inclined guide surface 321. This embodiment facilitates the misaligned insertion of the axial positioning protrusions 32 of the two sets of buckling components 3, and the inclined guide surfaces 321 facilitate the matching of the two sets of buckling components, thereby improving the convenience of engagement.

In this embodiment, when the fixed assembly 1 and the movable assembly 2 are engaged, reinforcing positioning protrusions 4 respectively arranged on the connecting portion 21 and the surrounding portion 11 are in misaligned distribution. During assembly of the present invention, the reinforcing positioning protrusions 4 on the movable assembly 2 cross the reinforcing positioning protrusions 4 of the fixed assembly 1 to form misaligned distribution. Since the reinforcing positioning protrusions 4 hinder each other, the fixed assembly 1 and the movable assembly 2 cannot be loosened without the application of a rotational external force. The present invention has a stable structure during use and thus can be used reliably.

In this embodiment, the axial positioning protrusions 32 of one of the buckling components 3 include at least one first axial positioning protrusion 32a with a width W, and the others are second axial positioning protrusions 32b with a width D, where W>D; the buckling component 3 matched with said buckling component 3 has a positioning groove 33a that receives the first axial positioning protrusion 32a. By arranging at least one wide first axial positioning protrusion 32a, the present invention prevents the problem that the fixed assembly 1 and the movable assembly 2 are not matched properly because the axial positioning protrusions 32 of the fixed assembly 1 and the movable assembly 2 are only engaged in part. By arranging the first axial positioning protrusion 32a with varying widths, the accurate axial alignment of the mixed component 1 and the movable assembly 2 is effectively ensured, which is beneficial to improving the use reliability of the present invention.

In this embodiment, a limiting protrusion 22 is arranged on a side of the connecting portion 21 away from the fixed assembly 1, and the positioning groove 33a is formed between the limiting protrusion 22 and the axial positioning protrusion 32 adjacent to the limiting protrusion 22; correspondingly, the first axial positioning protrusion 32a of each set of buckling components 3 of the fixed assembly 1 is located at an end of the fixed assembly 1 close to the movable assembly 2.

In this embodiment, accurate axial alignment of the fixed assembly 1 and the movable assembly 2 is effectively ensured through the matching of the first axial positioning protrusion 32a and the positioning groove 33a.

In this embodiment, a circumferential surface of the connecting portion 21 is provided with two or more sets of buckling components 3 evenly distributed and oriented in the same direction, wherein the circumferential positioning protrusions 31 of all the buckling components 3 are located on the same side of the axial positioning protrusions 32;

the surrounding portion 11 of the fixed assembly 1 is provided with a corresponding number of buckling components 3 evenly distributed and oriented in an opposite direction relative to the buckling components 3 on the surface of the connecting portion 21, wherein the circumferential positioning protrusions 31 of all the buckling components 3 are on the other side of the axial positioning protrusions 32.

By arranging multiple sets of mutually matched buckling components 3, the present invention effectively shortens the buckling distance, improves the convenience of use, and also ensures the reliability of this embodiment.

In this embodiment, at least one set of buckling components 3 is arranged on an outer peripheral surface of the connecting portion 21 of the movable assembly 2, and each buckling component 3 includes a circumferential positioning protrusion 31 arranged along an axial direction of the connecting portion 21; the circumferential positioning protrusion 31 has two or more mutually parallel axial positioning protrusions 32 extending along a circumferential direction of the connecting portion 21; a snap-in groove 33 is formed between every two adjacent axial positioning protrusions 32; the fixed assembly 1 has a surrounding portion 11 matched with the connecting portion 21, and an inner side of the surrounding portion 11 is provided with buckling components 3 misaligned with the buckling components 3 on the surface of the connecting portion 21; the buckling components 3 of the fixed assembly 1 and the corresponding buckling components 3 of the movable assembly 2 are arranged facing each other, and the axial positioning protrusions 32 of one of the two sets of buckling components 3 extend into the snap-in grooves 33 of the corresponding set of buckling components 3. According to the present invention, the mutually inserted axial positioning protrusions 32 limit each other to realize their axial positioning, and the axial positioning protrusions 32 are hindered by the matched circumferential positioning protrusions 31 to prevent their relative rotation in the circumferential direction, thereby realizing their engagement conveniently and quickly. The mutual matching of the buckling components 3 in the present invention is implemented in a square area, which effectively ensures the structural stability of their engagement. The present invention can be mounted conveniently, which brings convenience in use.

The above-mentioned embodiments and drawings do not limit the product form and style of this embodiment. Any appropriate changes or modifications made by those of ordinary skill in the art shall be regarded as not departing from the patent scope of this embodiment.

The invention claimed is:

1. An easy-to-mount connector, comprising a fixed assembly and a movable assembly, wherein the movable assembly has an end extending into the fixed assembly and connected to the fixed assembly, the movable assembly has a tubular connecting portion, wherein at least one set of first buckling components is arranged on an outer peripheral surface of the tubular connecting portion, each of the at least one set of first buckling components comprises a circumferential positioning protrusion arranged along an axial direction of the tubular connecting portion; the circumferential positioning protrusion has at least two mutually parallel axial positioning protrusions extending along a circumferential direction of the tubular connecting portion; wherein a snap-in groove is formed between every two adjacent axial positioning protrusions of the at least two mutually parallel axial positioning protrusions;

the fixed assembly has a surrounding portion matched with the tubular connecting portion, and an inner side of the surrounding portion is provided with at least one set of second buckling components that are misaligned with the at least one set of first buckling components on the outer peripheral surface of the tubular connecting portion; each of the at least one set of second buckling components comprises a circumferential positioning protrusion arranged along an axial direction of the surrounding portion; the circumferential positioning protrusion has at least two mutually parallel axial positioning protrusions extending along a circumferential direction of the surrounding portion; wherein a snap-in groove is formed between every two adjacent axial positioning protrusions of the at least two mutually parallel axial positioning protrusions; the at least one set of second buckling components of the fixed assembly and correspond with the at least one set of first buckling components of the movable assembly and are arranged facing each other, and the axial positioning protrusions of each of the at least one set of second buckling components extend into the snap-in grooves of the corresponding set of first buckling components, wherein the at least two mutually parallel axial positioning protrusions of the fixed assembly are configured to snap into the at least two mutually parallel axial positioning protrusions of the movable assembly.

2. The easy-to-mount connector according to claim 1, wherein for each of the sets of first and second buckling components, one end of each axial positioning protrusion starts from its circumferential positioning protrusion.

3. The easy-to-mount connector according to claim 2, wherein the axial positioning protrusions of one of the buckling components comprise at least one first axial positioning protrusion with a width W, and the others are second axial positioning protrusions with a width D, where W>D; the buckling component matched with the current buckling component has a positioning groove, the positioning groove receives the first axial positioning protrusion.

4. The easy-to-mount connector according to claim 1, wherein when the fixed assembly and the movable assembly rotate toward each other, the circumferential positioning protrusion of one each of the sets of first and second buckling components is on a moving path of the axial positioning protrusions their corresponding buckling component.

5. The easy-to-mount connector according to claim 4, wherein the axial positioning protrusions of one of the buckling components comprise at least one first axial positioning protrusion with a width W, and the others are second axial positioning protrusions with a width D, where W>D; the buckling component matched with the current buckling component has a positioning groove, the positioning groove receives the first axial positioning protrusion.

6. The easy-to-mount connector according to claim 1, wherein each of the circumferential positioning protrusions is a continuous integrated structure.

7. The easy-to-mount connector according to claim 6, wherein the axial positioning protrusions of one of the buckling components comprise at least one first axial positioning protrusion with a width W, and the others are second axial positioning protrusions with a width D, where W>D; the buckling component matched with the current buckling component has a positioning groove, the positioning groove receives the first axial positioning protrusion.

8. The easy-to-mount connector according to claim 1, wherein one end of each axial positioning protrusion of each of the sets of first and second buckling components away from its circumferential positioning protrusion has an inclined guide surface.

9. The easy-to-mount connector according to claim 8, wherein the axial positioning protrusions of one of the buckling components comprise at least one first axial positioning protrusion with a width W, and the others are second axial positioning protrusions with a width D, where W>D; the buckling component matched with the current buckling component has a positioning groove, the positioning groove receives the first axial positioning protrusion.

10. The easy-to-mount connector according to claim 1, wherein when the fixed assembly and the movable assembly are engaged, reinforcing positioning protrusions respectively arranged on the tubular connecting portion and the surrounding portion are in misaligned distribution.

11. The easy-to-mount connector according to claim 10, wherein the axial positioning protrusions of one of the buckling components comprise at least one first axial positioning protrusion with a width W, and the others are second axial positioning protrusions with a width D, where W>D; the buckling component matched with the current buckling component has a positioning groove, the positioning groove receives the first axial positioning protrusion.

12. The easy-to-mount connector according to claim 1, wherein the axial positioning protrusions of each of the sets of first and second buckling components comprise at least one first axial positioning protrusion with a width W, and the additional axial positioning protrusions are second axial positioning protrusions with a width D, where W>D; each of the sets of first and second buckling components has a positioning groove, the positioning grooves receive the corresponding first axial positioning protrusion of the sets of first and second buckling components.

13. The easy-to-mount connector according to claim 12, wherein a limiting protrusion is arranged on a side of the tubular connecting portion away from the fixed assembly, and the positioning groove of the at least one set of first buckling components is formed between the limiting protrusion and the first axial positioning protrusion of the at least one set of first buckling components that is adjacent to the limiting protrusion;

correspondingly, the first axial positioning protrusion of the at least one second set of buckling components of the fixed assembly is located at an end of the fixed assembly adjacent to the movable assembly.

14. The easy-to-mount connector according to claim 1, wherein the at least one set of first buckling components on the outer peripheral surface of the tubular connecting portion comprises two sets of first buckling components that are evenly distributed and oriented in the same direction, wherein the circumferential positioning protrusions of the at least one set of first buckling components are located on the same side of the axial positioning protrusions; the at least one set of second buckling components on the surrounding portion of the fixed assembly comprises two sets of second buckling components that are evenly distributed and oriented in an opposite direction relative to the two sets of first buckling components on the outer peripheral surface of the tubular connecting portion, wherein the circumferential positioning protrusions of the two sets of second buckling components are on an opposite side of the axial positioning protrusions of the two sets of second buckling components relative to the side of the circumferential positioning protrusions of the two sets of first buckling components.

* * * * *